(12) United States Patent
Bramley et al.

(10) Patent No.: US 8,491,949 B2
(45) Date of Patent: Jul. 23, 2013

(54) ICE CONFECTION

(75) Inventors: Allan Sidney Bramley, Sharnbrook (GB); Teresa Jane Brawn, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 1218 days.

(21) Appl. No.: 11/890,748

(22) Filed: Aug. 7, 2007

(65) Prior Publication Data

US 2008/0032017 A1 Feb. 7, 2008

(30) Foreign Application Priority Data

Aug. 7, 2006 (EP) .................................. 06118523

(51) Int. Cl.
*A23G 9/00* (2006.01)

(52) U.S. Cl.
USPC .......................................... 426/101; 426/660

(58) Field of Classification Search
USPC .................................................. 426/101, 660
See application file for complete search history.

(56) References Cited

U.S. PATENT DOCUMENTS 6,120,813 A * 9/2000 Barnes et al. ................... 426/66

FOREIGN PATENT DOCUMENTS

| EP | 1051077 | 10/2001 |
|---|---|---|
| EP | 1158862 | 5/2005 |
| EP | 1541034 | 6/2005 |
| WO | WO 95/29597 | 11/1995 |
| WO | WO 98/04148 | 2/1998 |
| WO | WO 98/04699 | 2/1998 |
| WO | WO 99/37673 | 7/1999 |
| WO | WO 99/38386 | 8/1999 |
| WO | WO 00/53027 | 9/2000 |
| WO | WO 00/53029 | 9/2000 |
| WO | WO 01/83534 | 11/2001 |

OTHER PUBLICATIONS http://www.innovatewithdairy.com/InnovateWithDairy/Articles/FAQ_MilkSolidNF_032905.htm, What is milk solids non-fat?, date Jun. 19, 2009, p. 1.*
European Search Report Application No. EP 07111721 completed Oct. 18, 2007.

* cited by examiner

*Primary Examiner* — Jyoti Chawla
(74) *Attorney, Agent, or Firm* — Gerard J. McGowan, Jr.

(57) ABSTRACT

An ice confection is provided comprising: 1 to 8 wt % fat; a total solids content of from 10 to 25 wt %; an ice structuring protein (ISP); and at least 0.1 wt % aerating agent; the confection being obtainable by a process comprising aerating a mix with an aerating gas which contains at least 50% by volume of carbon dioxide, nitrous oxide or mixtures thereof. A process for producing the ice confection is also provide.

7 Claims, 3 Drawing Sheets

ICE CONFECTION

FIELD OF THE INVENTION

The present invention relates to aerated ice confections. In particular, it relates to aerated ice confections that have a texture and appearance similar to that of ambient confections having a honeycomb structure.

BACKGROUND TO THE INVENTION

There is a continual need to provide novel ice confections, for example having an appearance and texture which is unlike conventional ice confections. In particular it is desirable to provide ice confections that mimic non-frozen (ambient) confections. One popular type of product comprises a confection, such as chocolate or toffee, which is aerated to form a foam-like or honeycomb structure. The honeycomb structure has large, visible gas bubbles with a range of different sizes which provides the product with a distinctive appearance and texture (i.e. crunchier and/or crumblier than the unaerated confection) when it is bitten into. This combination of appearance and texture provides substantial consumer appeal.

EP 1051077 discloses water ice products that are aerated with a water-soluble aerating gas and as a result have a different structure from those obtained by aerating with air. This is said to happen because as ice is formed, dissolved gas is forced out of solution. This results in an increase in internal pressure which can break the walls between neighbouring gas bubbles and thereby form voids or channels, which are typically non-spherical. EP 1158862 discloses water ice confections aerated with a water-soluble gas and containing an antifreeze protein. The confections have a brittle, crunchy texture, but do not reproduce the honeycomb appearance of ambient products. Thus there remains a need for products which have both the desirable appearance and texture of ambient honeycomb confections.

SUMMARY OF THE INVENTION

We have now found that ice confections having both a brittle, crunchy, crumbly texture and a honeycomb appearance can be produced by aerating with a water-soluble gas, provided that the ice confection formulation lies within a particular window in terms of fat and total solids content, and also contains an ice structuring (antifreeze) protein. Accordingly, the present invention provides an ice confection comprising from 1 to 8 wt % fat; a total solids content of from 10 to 25 wt %; an ice structuring protein (ISP); and at least 0.1 wt % aerating agent; the confection being obtainable by a process comprising aerating a mix with an aerating gas which contains at least 50% by volume of carbon dioxide, nitrous oxide or mixtures thereof.

Preferably the ice confection comprises at least 0.0005 wt % ISP.

Preferably the ice confection comprises from 2 to 6 wt % fat.

Preferably the aerating agent is a protein based aerating agent.

Preferably the ice confection comprises at most 0.3 wt % stabiliser.

Preferably the ice confection comprises from 1 to 8 wt % milk protein.

Preferably the ice confection has an overrun of from 20 to 150%.

In a second aspect the present invention provides a process for preparing an ice confection, comprising the steps of:

a) preparing a mix comprising 1 to 8 wt % fat; a total solids content of from 10 to 25 wt %; and at least 0.1 wt % aerating agent;
b) pasteurising and homogenising the mix;
c) adding an ice structuring protein (ISP);
d) simultaneously freezing and aerating the mix with an aerating gas which contains at least 50% by volume of carbon dioxide, nitrous oxide or mixtures thereof to produce the ice confection;
e) cold hardening the ice confection;
wherein step c) may take place before, during or after step b).

Preferably the aerating gas contains at least 70% by volume of carbon dioxide.

Preferably after step (d) the ice confection is extruded at a temperature of from −4 to −1.5° C.

DETAILED DESCRIPTION OF THE INVENTION

Unless defined otherwise, all technical and scientific terms used herein have the same meaning as commonly understood by one of ordinary skill in the art (e.g. in frozen confectionery manufacture, molecular biology and biochemistry). Definitions and descriptions of various terms and techniques used in frozen confectionery manufacture are found in Ice Cream, $6^{th}$ Edition, Robert T. Marshall, H. Douglas Goff and Richard W. Hartel (2003), Kluwer Academic/Plenum Publishers. Standard techniques are used for molecular and biochemical methods (see generally, Sambrook et al., Molecular Cloning: A Laboratory Manual, $3^{rd}$ ed. (2001) Cold Spring Harbor Laboratory Press, Cold Spring Harbor, N.Y. and Ausubel et al., Short Protocols in Molecular Biology (1999) $4^{th}$ Ed, John Wiley & Sons, Inc.—and the full version entitled Current Protocols in Molecular Biology).

All percentages, unless otherwise stated, refer to the percentage by weight, with the exception of percentages cited in relation to the overrun and gas composition.

Ice Structuring Proteins

Ice structuring proteins (ISPs) are proteins that can influence the shape and size of the crystals of ice formed during freezing, and inhibit recrystallisation of ice (Clarke et al., 2002, Cryoletters 23: 89-92; Marshall et al., Ice Cream, $6^{th}$ Edition, ibid.). Many of these proteins were identified originally in organisms that live in sub-zero environments and are thought to protect the organism from the deleterious effects of the formation of ice crystals in the cells of the organism. For this reason many ice structuring proteins are also known as antifreeze proteins (AFPs). In the context of the present invention, an ISP is defined as a protein that has ice recrystallisation inhibitory (RI) activity.

Ice recrystallisation inhibitory activity properties can conveniently be measured by means of a modified splat assay as described in WO00/53029:

2.5 μl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20× objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transfered to a Quantimet 520 MC image analysis system (Leica, Cambridge UK) by means of a Sony monochrome CCD videocamera.

Ice crystal sizing can be performed by hand-drawing around the ice-crystals. Typically, at least 100 to 400 crystals are sized for each sample. The ice crystal size is taken as being the longest dimension of the 2D projection of each crystal. The average crystal size is determined as the number average of the individual crystal sizes. The size of the ice-crystals in both assays is compared. If the size at 30-60 minutes is similar or only moderately (less than 10%) increased compared to the size at t=0, and/or the crystal size is less than 20 micrometer, preferably from 5 to 15 micrometer this is an indication of good ice-crystal recrystallisation properties.

Significant ice recrystallisation inhibitory activity can be defined as where a 0.01 wt % solution of the ISP in 30 wt % sucrose, cooled rapidly (at least $\Delta 50°$ C. per minute) to $-40°$ C., heated rapidly (at least $\Delta 50°$ C. per minute) to $-6°$ C. and then held at this temperature results in an increase in average ice crystal size over one hour of less than 5 µm.

Types of ISPs

ISPs for use according to the present invention can be derived from any source provided they are suitable for inclusion in food products. ISPs have been identified to date in fish, plants, lichen, fungi, micro-organisms and insects. In addition, a number of synthetic ISPs have been described.

Examples of fish ISP materials are AFGP (for example obtainable from Atlantic cod, Greenland cod and Tomcod), Type I ISP (for example obtainable from Winter flounder, Yellowtail flounder, Shorthorn sculpin and Grubby sculpin), Type II ISP (for example obtainable from Sea raven, Smelt and Atlantic herring) and Type III ISP (for example obtainable from Ocean pout, Atlantic wolffish, Radiated shanny, Rock gunnel and Laval's eelpout).

Type III ISPs are particularly preferred. Type III ISPs typically have a molecular weight of from about 6.5 to about 14 kDa, a beta sandwich secondary structure and a globular tertiary structure. A number of genes encoding type III ISPs have been cloned (Davies and Hew, 1990, FASEB J. 4: 2460-2468). A particularly preferred type III ISP is type III HPLC-12 (Accession No. P19614 in the Swiss-Prot protein database).

Lichen AFPs are described in WO99/37673 and WO01/83534.

Examples of plants in which ISPs have been obtained are described in WO98/04699 and WO98/4148 and include garlic-mustard, blue wood aster, spring oat, winter cress, winter canola, Brussels sprout, carrot (GenBank Accession No. CAB69453), Dutchman's breeches, spurge, daylily, winter barley, Virginia waterleaf, narrow-leaved plantain, plantain, speargrass, Kentucky bluegrass, Eastern cottonwood, white oak, winter rye (Sidebottom et al., 2000, Nature 406: 256), bittersweet nightshade, potato, chickweed, dandelion, spring and winter wheat, triticale, periwinkle, violet and grass.

The ISPs can be obtained by extraction from native sources by any suitable process, for example the isolation processes as described in WO98/04699 and WO98/4148.

Alternatively, ISPs can be obtained by the use of recombinant technology. For example host cells, typically microorganisms or plant cells, may be modified to express ISPs and the ISPs may then be isolated and used in accordance with the present invention. Techniques for introducing nucleic acid constructs encoding ISPs into host cells are well known in the art.

Typically, an appropriate host cell or organism would be transformed by a nucleic acid construct that encodes the desired ISP. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species include yeasts such as (but not limited to) those of the genera *Saccharomyces, Kluyveromyces, Pichia, Hansenula, Candida, Schizo saccharomyces* and the like, and filamentous fungal species such as (but not limited to) those of the genera *Aspergillus, Trichodenna, Mucor, Neurospora, Fusarium* and the like. Preferably the species selected is a yeast, most preferably a species of *Saccharomyces* such as *S. cerevisiae*. Where glycosylation of the ISP leads to reduced activity then it is preferred that the host exhibits reduced glycosylation of heterologous proteins.

A wide variety of plants and plant cell systems can also be transformed with the nucleic acid constructs of the desired polypeptides. Examples of plant species include maize, tomato, tobacco, carrots, strawberries, rape seed and sugar beet.

The sequences encoding the ISPs are preferably at least 80% identical at the amino acid level to an ISP identified in nature, more preferably at least 95% or 100% identical. However, persons skilled in the art may make conservative substitutions or other amino acid changes that do not reduce the RI activity of the ISP. For the purpose of the invention these ISPs possessing this high level of identity to an ISP that naturally occurs are also embraced within the term "ISPs".

Ice Confections

Ice confections are sweet-tasting fabricated foodstuffs intended for consumption in the frozen state (i.e. under conditions wherein the temperature of the foodstuff is less than $0°$ C., and preferably under conditions wherein the foodstuff comprises significant amounts of ice). Ice confections of the present invention comprise from 1 to 8 wt % fat and have a total solids content of from 10 to 25 wt %. We have found that these amounts of fat and total solids, in combination with a water-soluble aerating gas and an ISP, results in products having both the desired texture and appearance. Typical water ice formulations (which do not contain fat) and standard ice cream formulations (which have a total solids content of at least about 30 wt %) are therefore outside the scope of the present invention.

The ice confections of the present invention preferably comprise from 2 to 6 wt %, more preferably from 2.5 to 5 wt % fat. The fat may come from any suitable source suitable, for example butterfat, coconut oil, palm oil, cocoa butter, sunflower oil, olive oil or rapeseed oil, and mixtures or fractions thereof.

The total solids content of an ice confection is the dry weight of the confection, i.e. the sum of the weights of all the ingredients other than water, expressed as a percentage of the total weight. It is measured as described in Ice Cream, $6^{th}$ Edition, p 296. The ice confections of the present invention have a total solids content of from 10 to 25 wt % of the ice confection. Preferably the total solids content is at least 12%, more preferably at least 15%, most preferably at least 18%. Preferably the total solids content is at most 24%, more preferably at most 22%.

Ice confections according to the present invention contain ice. Since the total solids content is from 10 to 25 wt %, the water content is correspondingly from 90 to 75 wt %. At a temperature of −18° C. most, but not all, of the water is frozen.

Ice confections of the invention typically comprise at least about 0.0001 wt % ISP, more preferably at least 0.0005 wt %. ISPs can be used at very low concentrations and therefore preferably the confections comprise less than 0.05 wt % ISP. A preferred range is from about 0.001 to 0.01 wt %, more preferably from 0.005 to 0.01 wt %.

An aerating agent refers to any component which because of its surface activity and/or the viscosity it imparts, aids the formation of small gas bubbles and resists their coalescence or separation. The aerating agent is to be understood not to include the aerating gas. Preferably the aerating agent is a protein-based aerating agent, for example a hydrolysed milk protein such as Hygel™ and Hyfoama™ (available from Kerry Biosciences); or a hydrolysed soya protein such as Versawhip (available from Kerry Biosciences) and D-100™ (available from Gunter Industries). Alternatively, the aerating agent may be non-protein-based, for example a monoglyceride, such as Myverol 18-04K (a distilled 95% monoglyceride prepared from vegetable oils, available from Quest International), or a polyglycerol ester, such as PGE 55 (a polyglycerol ester of fatty acids, available from Danisco). The amount of aerating agent in the confection is at least 0.1 wt %, preferably at least 0.15 wt %. Preferably the amount of aerating agent is less than 0.5 wt %, preferably less than 0.4 wt %, more preferably less than 0.25 wt %.

Ice confections of the invention may comprise stabiliser. Stabilisers include proteins such as gelatin; plant extrudates such as gum arabic, gum ghatti, gum karaya, gum tragacanth; seed gums such as locust bean gum, guar gum, tara gum, psyyllium seed gum, quince seed gum or tamarind seed gum; konjac mannan; seaweed extracts such as agar, alganates, carrageenan or furcelleran; pectins such as low methoxyl or high methoxyl-type pectins; cellulose derivatives such as sodium carboxymethyl cellulose, microcrystalline cellulose, methyl and methylethyl celluloses, or hydroxylpropyl and hydroxypropylmethyl celluloses; and microbial gums such as dextran, xanthan or β-1,3-glucan. The stabiliser may be a single stabiliser, or a mixture of two or more stabilisers. Preferably, the stabiliser is locust bean gum. The amount of stabiliser is preferably at most 0.3 wt %, more preferably at most 0.25 wt %. For example, the amount of stabiliser is typically from 0 to 0.2 wt %.

Ice confections of the invention may contain protein (in addition to any protein based aerating agent), preferably in an amount of at least 1 wt %, more preferably at least 1.5 wt %. Ice confections containing at least this amount of protein are perceived as milk ice-type products and are more attractive to many consumers than substantially protein-free ice confections. Preferably the protein content is less than 8 wt %, more preferably less than 6 wt %, most preferably less than 3 wt %. Suitable proteins for use in the present invention include milk proteins, egg proteins and gelatin as well as vegetable proteins such as soya proteins. Particularly preferred are milk proteins owing to their superior flavour and heat stability. Suitable sources of milk protein include milk, concentrated milk, milk powders, whey, whey powders and whey protein concentrates/isolates.

Ice confections of the invention typically comprise sugars e.g. sucrose, fructose, dextrose, lactose, corn syrups, sugar alcohols; they may also contain other ingredients, for example colours and flavours.

The ice confection preferably has an overrun of at least 20%, more preferably at least 40%, most preferably at least 60%. Preferably the overrun is at most 150%, more preferably at most 120%, most preferably at most 120%. Overrun is defined by the following equation:

$$\text{overrun}(\%) = \frac{\text{density of mix} - \text{density of ice confection}}{\text{density of ice confection}} \times 100.$$

"Mix" refers to the unaerated mix prior to aeration (or following de-aeration of the melted ice confection). Overrun is measured at atmospheric pressure.

The ice confection containing of the invention may constitute an entire product or may be a component of a composite product. In a composite product the ice confection of the invention provides contrast in texture and appearance to the other component(s) of the product. Preferably such composite products contain the ice confection as a discrete element in their structure. For example, a relatively soft ice cream core can be coated with a layer of the ice confection to provide a hard, crispy layer surrounding the ice cream core. Another example is the incorporation of the ice confection as inclusions. Alternatively the ice confection may be provided with a continuous or partial coating of, for example, a water glaze, a non-aerated water ice or chocolate on at least one surface. In a composite product the determination of the total solids and the fat, aerating agent, ice structuring protein, stabiliser, and proteins contents takes into account only the ice confection, and not other components of the composite product.

Process

The present invention further provides an especially suitable method of preparation of ice confections of the invention comprising the steps of:
(a) preparing a mix of ingredients; then
(b) pasteurising and homogenising the mix; then
(c) adding an ice structuring protein (ISP);
(d) simultaneously freezing and aerating the mix with an aerating gas which contains at least 50% by volume of a carbon dioxide, nitrous oxide or mixtures thereof to produce the ice confection (for example in an ice cream freezer);
(e) cold hardening the ice confection.
wherein step (c) may take place before, during or after step (b).

The mix is aerated with a gas containing at least about 50% by volume of carbon dioxide, nitrous oxide or mixtures thereof, preferably at least about 70%, more preferably 100%. The remainder of the aerating gas will typically be a nitrogen-containing gas such as air. Most preferably the aerating gas is 100% carbon dioxide.

After freezing, the resulting ice confection may be shaped e.g. by extrusion followed by cutting or by moulding, prior to the cold hardening step. Preferably the ice confection is extruded at a temperature of from 4 to −1.5° C., more preferably from −2.5 to −1.5° C. We have found that relatively high extrusion temperatures result in a particularly good foam-like appearance.

Preferably the cold hardening step takes place at a temperature of about −25° C. or below, for example by blast freezing.

After cold hardening, the ice confections are preferably stored at a temperature in the range of −25 to −10° C., typically about −18° C.

The present invention will now be further described with reference to the following examples, which are illustrative only and non-limiting, and figures wherein.

EXAMPLES

Figure 1:
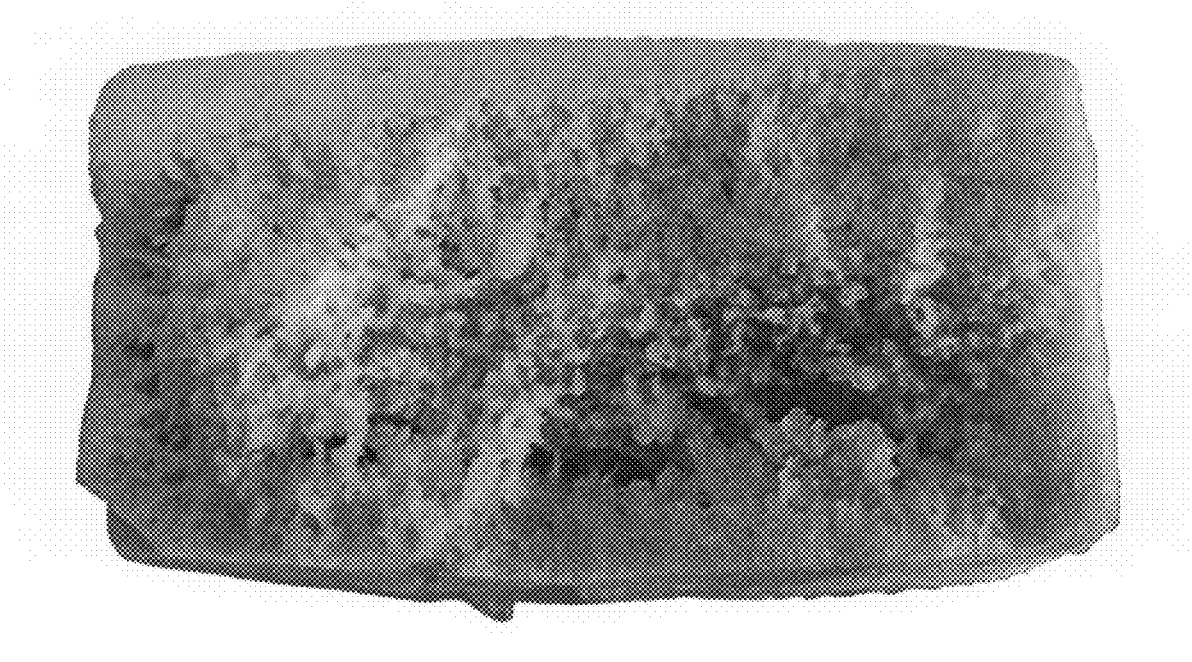
FIG. 1 is a photograph of an internal surface of a water ice containing ISP that was aerated with carbon dioxide.

Ice confection formulations are shown in table 1. The ice structuring protein (ISP) is recombinant ocean pout type III HPLC-12 produced in yeast essentially as described in WO97/02343.

TABLE 1

| Ingredient (wt %) | 1 | 2 | 3 | A | B | C |
|---|---|---|---|---|---|---|
| Coconut oil | 2.0 | 4.5 | | | 4.0 | 2.0 |
| Cocoa mass | | | 6.0 | | | |
| Whole milk powder | | | 5.0 | | | |
| Skim milk powder | 3.0 | 4.0 | | | 3.0 | 3.0 |
| Whey powder | 2.0 | 1.5 | | | 1.5 | 2.0 |
| Sucrose | 9.0 | 8.0 | 5.0 | 10.0 | 8.0 | 9.0 |
| Glucose | | | | 5.0 | | |
| Fructose | 4.0 | 4.0 | 4.0 | | 2.0 | 4.0 |
| Hygel | 0.15 | 0.15 | 0.15 | 0.15 | 0.15 | 0.15 |
| 63 DE corn syrup | | | 1.5 | | | |
| Locust bean gum | 0.2 | 0.2 | 0.0 | 0.2 | 0.2 | 0.2 |
| Emulsifier (HP60) | | | | | 0.1 | |
| ISP | 0.005 | 0.005 | 0.01 | 0.005 | 0.005 | 0.0 |
| Water | To 100 | To 100 | To 100 | To 100 | To 100 | To 100 |
| Total solids | 20.2 | 22.1 | 22.0 | 14.2 | 18.7 | 20.2 |
| Fat | 2.1 | 4.6 | 4.6 | 0.0 | 4.1 | 2.1 |

Examples 1 to 3 are milk ice-type formulations according to the invention. Comparative example A is a water ice formulation, which does not contain fat and so is outside the scope of the invention. Comparative example B has a formulation according to the invention, but (as explained below) was not aerated with a water-soluble gas. Comparative example C has the same formulation as example 1 but with no ISP.

The dry ingredients were blended together with the water (at a temperature of 80° C.) using a high shear mixer for approximately 3 minutes. The temperature of the mixes was approximately 55-65° C. after mixing. Each mix was homogenised and passed through a plate heat exchanger for pasteurisation, and then cooled to approximately 4° C. in the plate heat exchanger. ISP was added immediately prior to processing (except for Comparative example C). Each mix was simultaneously frozen and aerated using a WCB MF75 ice cream freezer with an open dasher. Initially the mix was aerated with air, but once the desired overrun and extrusion temperature was achieved the flow of air was replaced with 100% carbon dioxide. Comparative example B was collected while the mix was being aerated with air, not carbon dioxide. The extrusion temperatures on exit from the freezer and overruns at extrusion are given in table 2.

TABLE 2

| | Example | | | | | |
|---|---|---|---|---|---|---|
| | 1 | 2 | 3 | A | B | C |
| Temperature (° C.) | −2.7 | −2.2 | −2.4 | −2.1 | −2.1 | −3.3 |
| Overrun (%) | 75 | 70 | 53 | 95 | 73 | 90 |

Examples 1, 3 and comparative examples A, B and C were collected in 500 ml cardboard packs and hardened in a blast freezer at −35° C. for 3 hours, then stored in a cold store at −25° C. Example 2 was produced as a stick product by extruding the milk ice into metal moulds, inserting sticks and then hardening in a blast freezer at −35° C. for 3 hours. The products were then removed from the mould and stored in a cold store at −25° C.

Assessment of the appearance of the products was made by taking photographs of slices of the hardened blocks and the surface of the stick product. By assessing the size and distribution of the bubbles in the photographs, the appearance of the products was compared (the desired appearance was foam-like with visible bubbles). Evaluation of the sensory properties, in particular brittle, crumbly and crunchy texture, was carried out through informal tasting.

Comparative example A is a water ice containing ISP that was aerated with carbon dioxide (as disclosed in EP 1158862). Sensory testing showed that it had a brittle and crunchy texture as expected. FIG. 1 is a photograph of an internal surface revealed by slicing through the product. The photograph shows that, as expected for an aerating gas which is water-soluble, a substantial number of the gas bubbles have undergone channelling so that some very large non-spherical voids are observed. Small spherical gas cells are also visible, but although the product had the desired crunchy texture, the appearance was not honeycomb-like.

Figure 2:
FIG. 2 is a photograph of an internal surface of a milk ice containing ISP that was aerated with air.

Comparative example B is a milk ice containing ISP that was aerated with air. Sensory testing showed that it had a firm, crunchy texture, but that it was not crumbly. FIG. 2 is a photograph of an internal surface revealed by slicing through the product. The photograph shows that the gas bubbles, although large enough to be visible, are still too small and too uniform in size to produce the desired honeycomb-like appearance.

Figure 3:
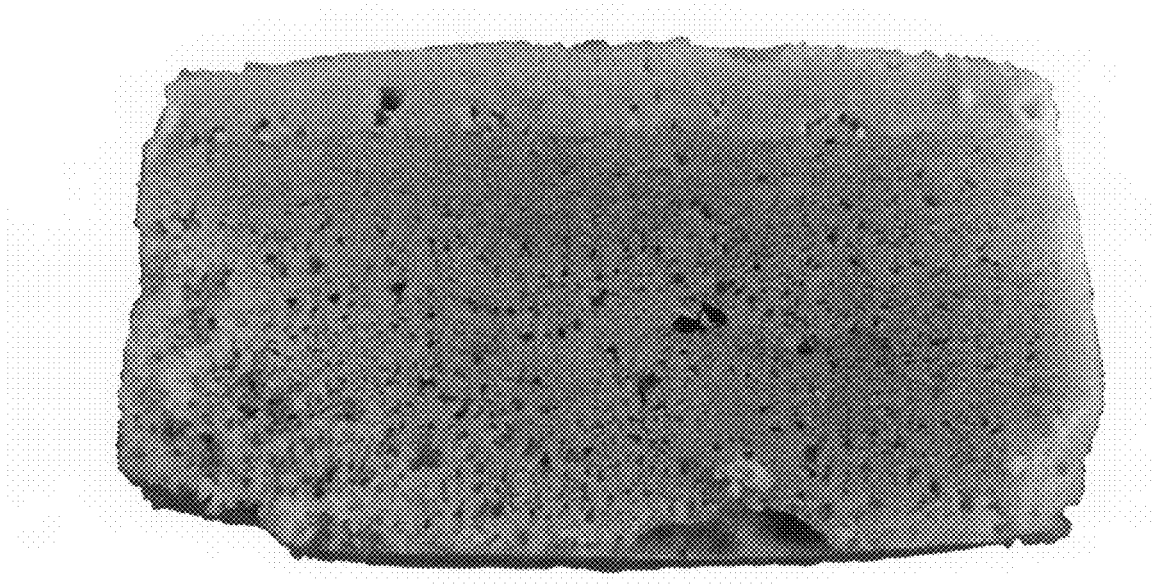
FIG. 3 is a photograph of an internal surface of a milk ice that was aerated with carbon dioxide, but which does not contain ISP.

Comparative example C is a milk ice that was aerated with carbon dioxide, but which does not contain ISP. Sensory testing showed that it had a soft, not crunchy texture. FIG. 3 is a photograph of an internal surface revealed by slicing through the product. The photograph shows a fairly uniform distribution of very small bubbles (so small that it is difficult to see individual bubbles). Thus the product has neither the desired texture nor honeycomb-like appearance.

Figure 4:
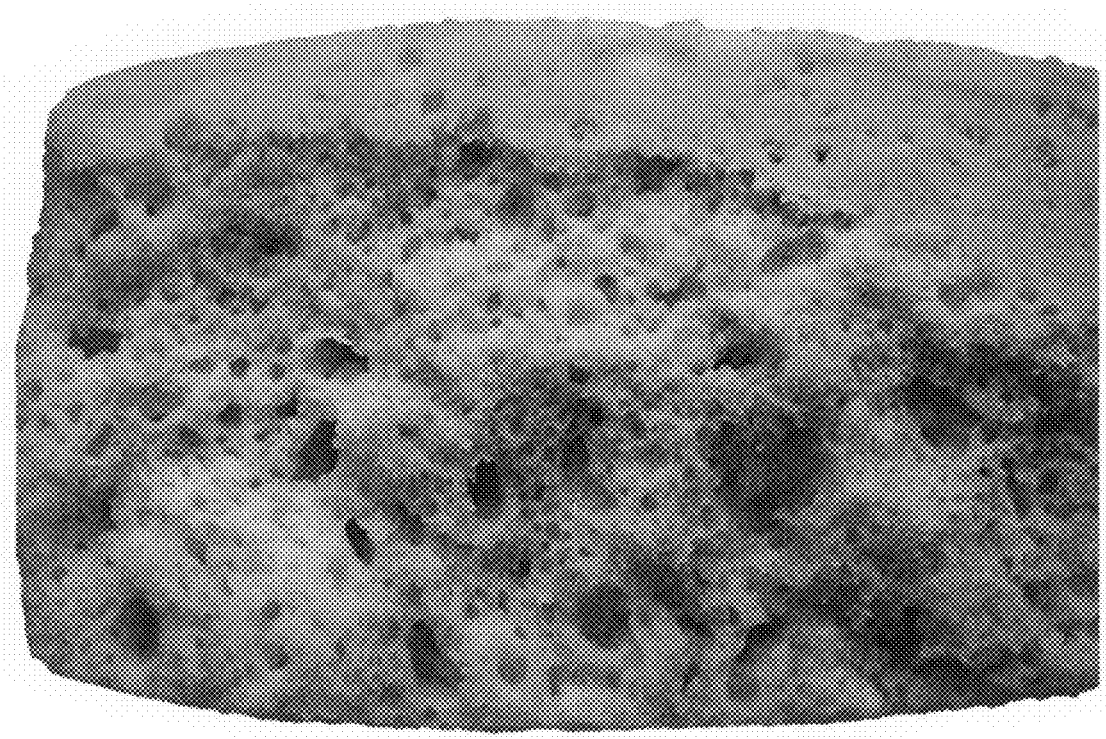
FIG. 4 is a photograph of an internal surface of a milk ice containing ISP that was aerated with carbon dioxide.

Example 1 is a milk ice containing ISP that was aerated with carbon dioxide. Sensory testing showed that it had a brittle and crunchy texture, and was less icy than the water ice (comparative example A). FIG. 4 is a photograph of an internal surface revealed by slicing through the product. The photograph shows a large number of visible gas cells, with a much wider distribution of sizes than the sample without ISP (comparative example C). However, it does not show the very large voids caused by channelling of the gas cells that were observed in the water ice sample (comparative example A). Thus the product has both the desired crunchy texture and the honeycomb-like appearance.

Figure 5:
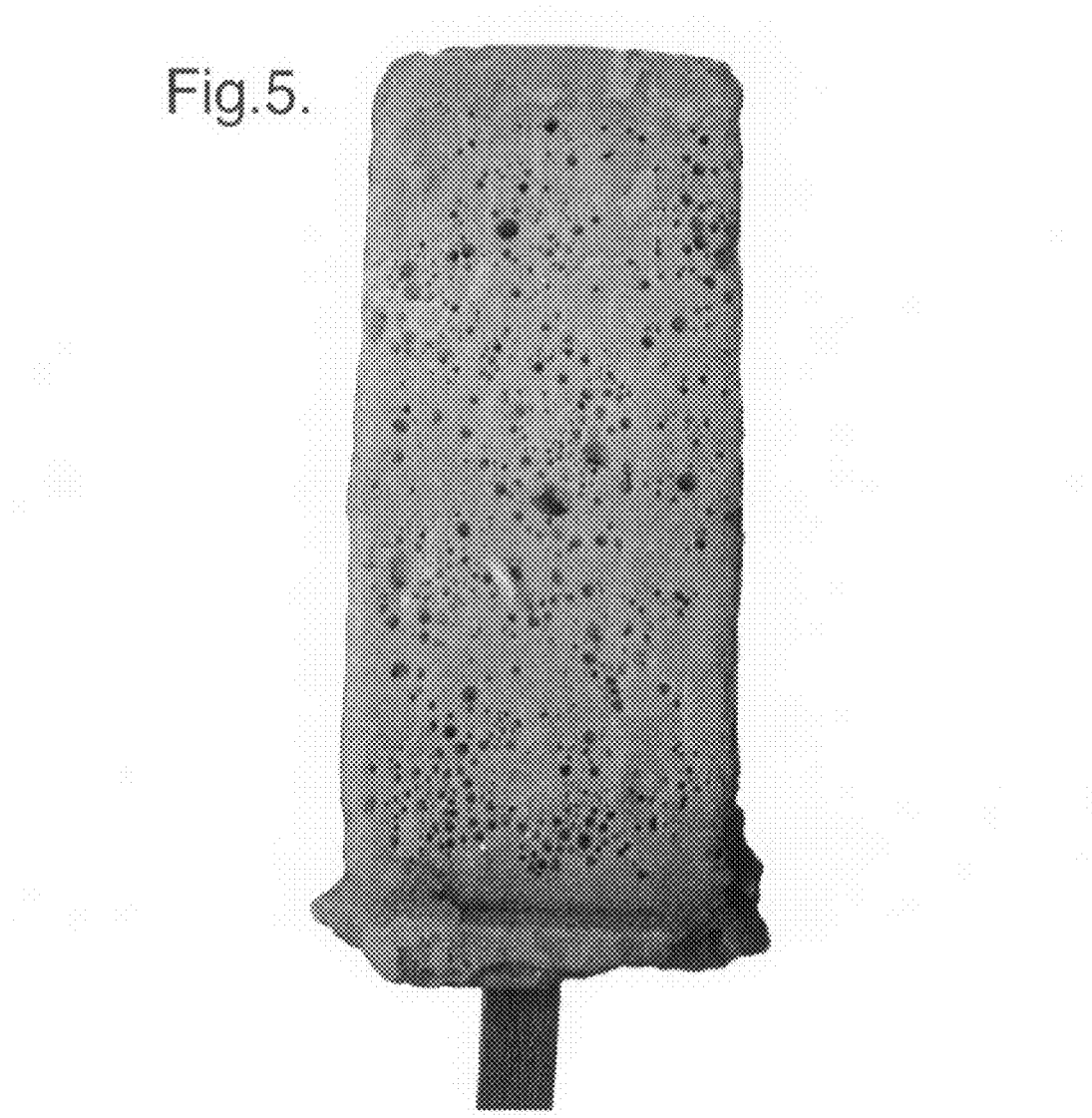
FIG. 5 is a photograph of the surface of a milk ice containing ISP that was aerated with carbon dioxide.

Example 2 is a higher fat milk ice containing ISP that was aerated with carbon dioxide and frozen in a mould to form a stick product. Sensory testing showed that it had a brittle and crunchy texture. FIG. 5 is a photograph of the surface of the product. The photograph shows a large number of visible gas cells, but no very large voids caused by channelling. Thus the product has both the desired crunchy texture and the honeycomb-like appearance.

Figure 6:
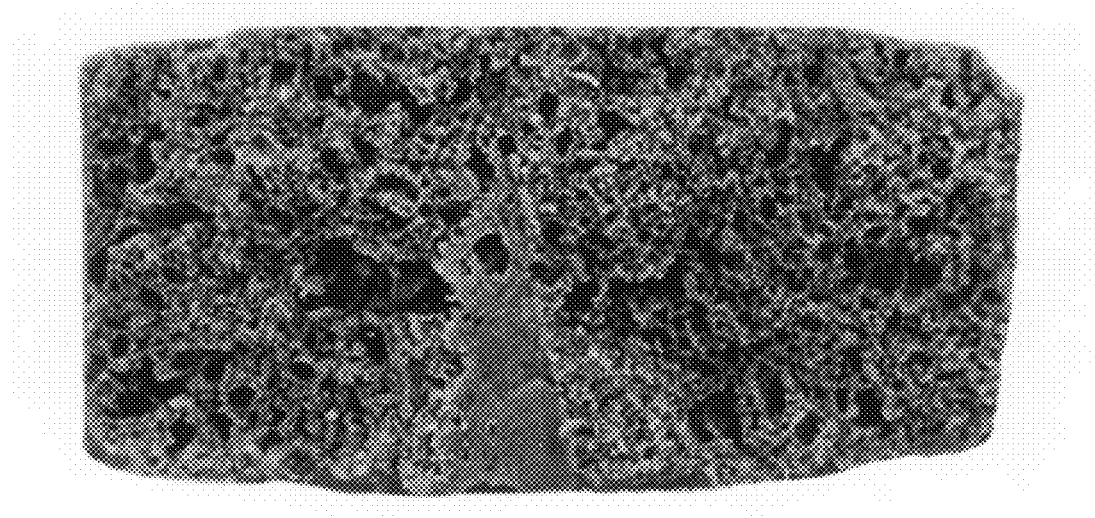
FIG. 6 is a photograph of an internal surface of a chocolate milk ice containing ISP that was aerated with carbon dioxide.

Example 3 is a chocolate milk ice containing ISP that was aerated with carbon dioxide. Sensory testing showed that it had a brittle and crunchy texture. FIG. 6 is a photograph of an internal surface revealed by slicing through the product. Again, the photograph again shows a large number of visible gas cells, but no very large voids caused by channelling. Thus the product has both the desired crunchy texture and the honeycomb-like appearance.

These results demonstrate that aerated ice confections having both a brittle, crunchy texture and the honeycomb-like appearance of ambient foam-like products can be produced by aerating with a water-soluble gas such as carbon dioxide in combination with the presence of an ice structuring protein, provided that a particular formulation window is used in terms of fat and total solids content. The structures of products according to the invention can be distinguished from water ices containing ISP that have been aerated with a water-soluble gas by the presence of large visible, approximately spherical gas cells and an absence of large channels and voids. Furthermore, the products according to the invention have the added advantage that they are less cold and icy than similar water ice products, and therefore are better mimics of the in-mouth properties of ambient honeycomb products.

The various features and embodiments of the present invention, referred to in individual sections above apply, as appropriate, to other sections, mutatis mutandis. Consequently features specified in one section may be combined with features specified in other sections, as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:
1. An ice confection comprising:
  1 to 8 wt % fat;
  a total solids content of from 10 to 25 wt %;
  an ice structuring protein (ISP);
  at least 0.1 wt % aerating agent
the confection being obtainable by a process comprising aerating a mix with an aerating gas which contains at least 50% by volume of carbon dioxide, nitrous oxide or mixtures thereof, the confection having a brittle, crunchy and crumbly texture and a honeycomb appearance.

2. An ice confection according to claim 1 comprising at least 0.0005 wt % ISP.

3. An ice confection according to claim 1 comprising from 2 to 6 wt % fat.

4. An ice confection according to claim 1 wherein the aerating agent is a protein based aerating agent.

5. An ice confection according to claim 1 comprising at most 0.3 wt % stabiliser.

6. An ice confection according to claim 1 comprising from 1 to 8 wt % milk protein.

7. An ice confection according to claim 1 having an overrun of from 20 to 150%.

* * * * *